Aug. 22, 1933.  K. R. LEWIS ET AL  1,923,736
VULCANIZING DEVICE
Filed June 10, 1931  4 Sheets-Sheet 2

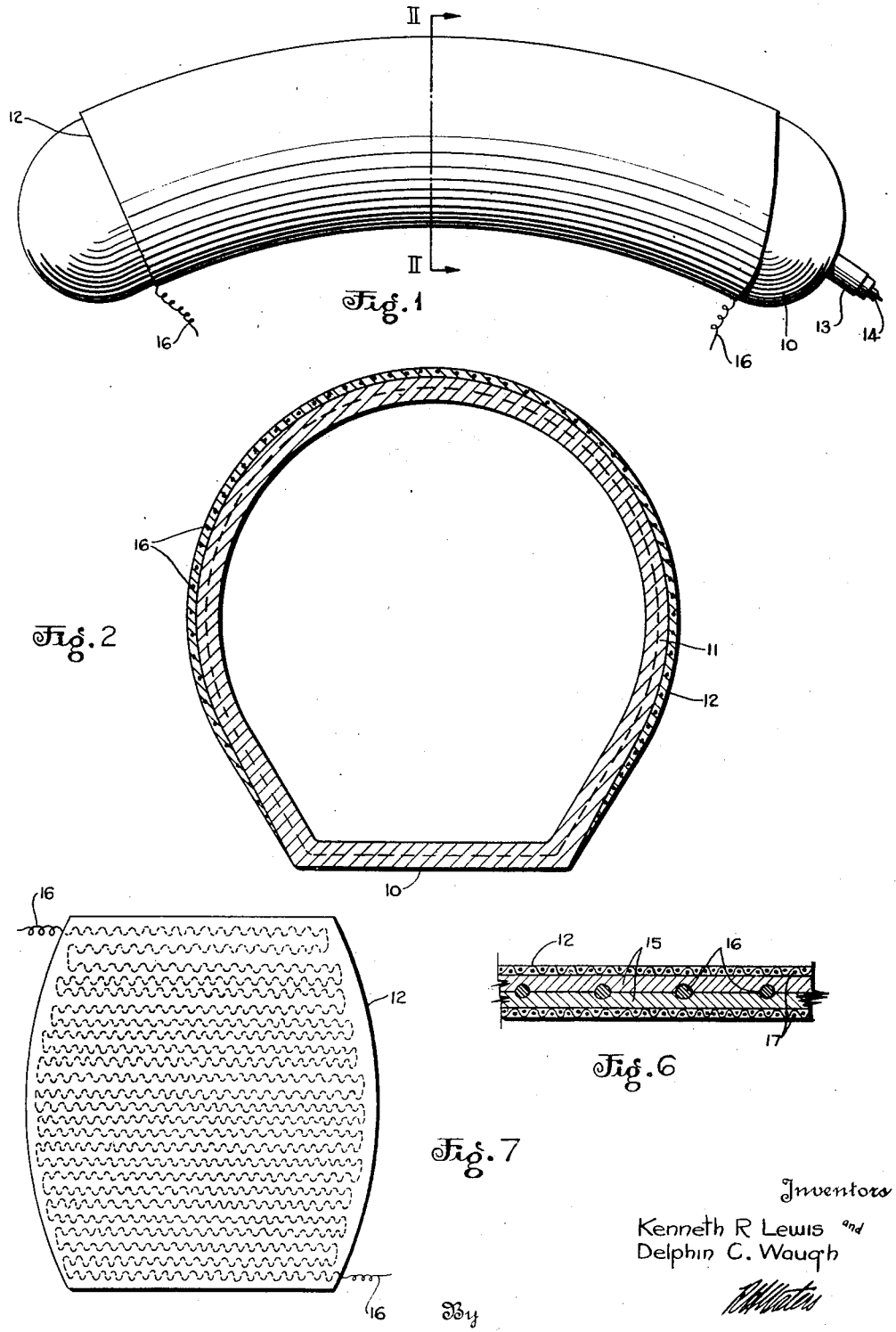

Inventors
Kenneth R. Lewis
and Delphin C. Waugh
By
Attorney

Aug. 22, 1933.　　K. R. LEWIS ET AL　　1,923,736
VULCANIZING DEVICE
Filed June 10, 1931　　4 Sheets-Sheet 4

Inventors
Kenneth R. Lewis and
Delphin C. Waugh

Attorney

Patented Aug. 22, 1933

1,923,736

UNITED STATES PATENT OFFICE 1,923,736

VULCANIZING DEVICE

Kenneth R. Lewis and Delphin C. Waugh, Akron, Ohio, assignors to The Goodyear Tire & Rubber Company, Akron, Ohio, a Corporation of Ohio Application June 10, 1931. Serial No. 543,329

9 Claims. (Cl. 18—18)

This invention relates to the vulcanization of rubber articles and it has particular relation to a device for vulcanizing rubber material in repairing pneumatic tires.

One object of the invention is to provide a vulcanizing assembly that will treat both sides of a tire with vulcanizing heat during the repair thereof.

Another object of the invention is to provide a vulcanizing unit which is adapted to be energized uniformly with both heat and pneumatic pressure.

Another object of the invention is to provide a vulcanizing assembly of mold and electric heating elements particularly adapted for use in repair shops.

Another object of the invention is to provide a vulcanizing construction in which tires having various bead diameters may be accommodated in a single vulcanizing unit.

Another object of the invention is to provide interchangeable bead engaging elements in a vulcanizing assembly to accommodate tires having various bead diameters.

In previously known types of vulcanizing apparatus for repairing injured tires, a number of different constructions have been employed including heating pads applied under pressure to the injured portion of the tire, and molds having steam chambers therein for supplying vulcanizing heat. It is essential in repairing pneumatic tires that the vulcanizing heat be localized as much as possible because of the danger of overcuring portions of the tire surrounding the injury. Also a minimum amount of equipment is desirable in order to avoid complicated operations that tend to increase expenses and prolong the repairing operation.

According to this invention a very simple and easily operated construction is employed which includes the use of one or more electrically heated pads disposed on either or both sides of an injury in a tire, and one of the pads is vulcanized to, or forms a part of, an inflatable container composed primarily of rubber compound. A mold, adjustable for accommodating various sizes of tires, encloses each repaired tire and the heating elements are applied thereto during the repairing operations.

For a better understanding of the invention, reference may now be had to the accompanying drawings forming a part of the specification, of which;

Figure 1 is a side elevational view of an airbag embodying the invention;

Figure 2 is a cross-sectional view, on a larger scale, taken substantially along the line II—II of Figure 1;

Figure 6 is a fragmentary cross-sectional view, on a larger scale, of one construction of heating pad;

Figure 7 is a plan view of a heating pad;

Figure 3:
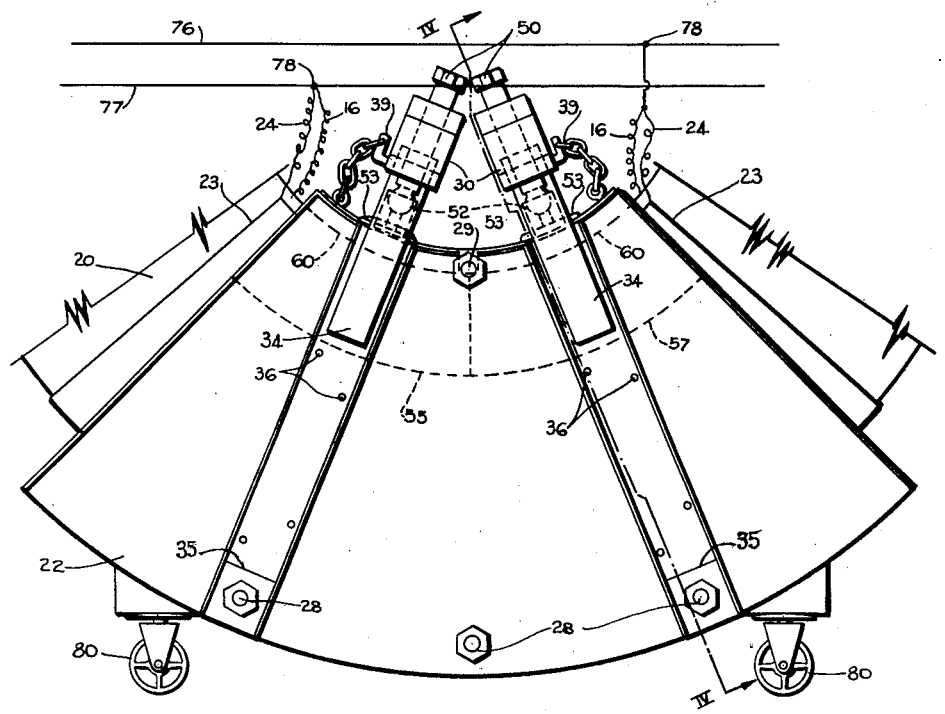
Figure 3 is a side elevational view of a vulcanizing assembly including molding sections and heating pads.

In practicing the invention an airbag 10 composed of rubber compound and reinforcing material 11, such as cord or fabric, is provided with an outer pad or cover 12 which is composed primarily of vulcanizable material. A conventional valve stem 13 and a valve 14 are provided, through which fluid, preferably air, under pressure is forced into the airbag.

One form of pad 12 includes layers 15 of rubber compound, having a wire or like electric conductor 16 disposed between them, and layers 17 of rubberized textile material such as crosswoven fabric or cord fabric providing an outer covering for the pad. As best shown by Figure 7, the electric conductor 16 extends from opposite end portions of the pad and is arranged in re-entrant paths to form a screen-like mesh throughout the extent of the pad. Preferably the wires are crimped or crinkled and arranged in the manner illustrated by Figure 7, this crimped arrangement permitting the wires to stretch considerably without harmful effect, when the device is expanded. This assembly of rubber 15 and rubberized fabric 17 with the conductor 16 therein is vulcanized upon the airbag either before or after the airbag has been vulcanized or partially vulcanized, thereby forming a unitary inflatable container including an outer electrically heated wall portion. Also, the pad may be vulcanized or partially vulcanized before it is permanently applied to the bag.

Figure 4:
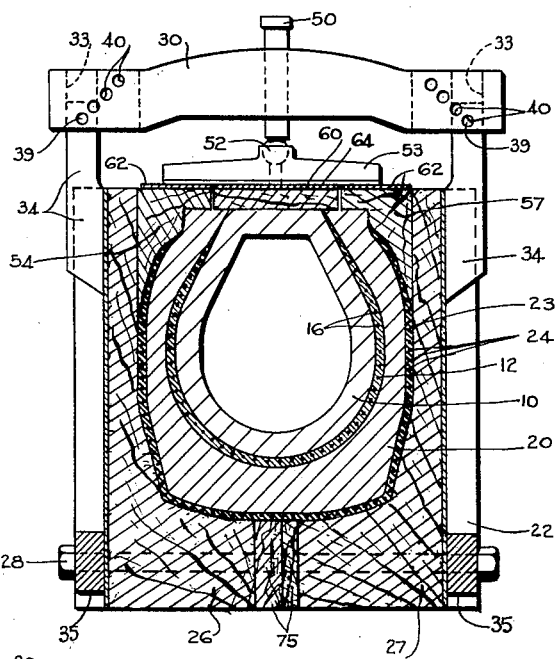
Figure 4 is a cross-sectional view taken substantially along the line IV—IV of Figure 3.

As best shown by Figures 3 and 4, this airbag is adapted to be placed within a pneumatic tire 20 which is enclosed in a mold 22. A second pad 23, constructed in substantially the same manner as the pad 12, is also provided with an electric conductor 24. For purposes of convenience the pad 23 is considerably thinner than the pad 12.

Figure 5:
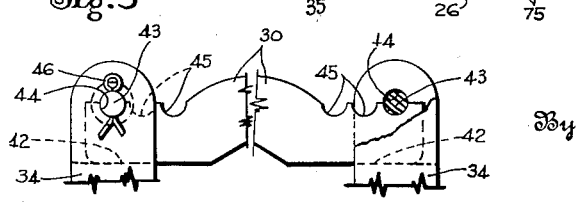
Figure 5 is a fragmentary elevational view, on a larger scale, showing in detail one construction of mold assembling elements.

The mold, which is preferably constructed of two wooden sections 26 and 27, is assembled by means of bolts 28 and 29 extending therethrough and by means of yokes 30 having slots 33 therein, through which the upper end of straps or bars 34 extend. Since wood is not a good conductor of either heat or electricity, it is especially adapted for use in the kind of construction described herein. Suitable screws 36 and the bolts 28 rigidly unite the mold and the straps 34. In order to facilitate turning of the bolts 28, spacers 35 are provided between the straps 34 and the heads of the bolts 28. Pins 39 extend through the end portions of the straps and facilitate assembly of the construction described. In one form of assembly several openings 40 are provided in the end portions of the yokes for receiving the pins and also for insuring proper adjustment of the width of the mold. In another form of assembly (Figure 5) the yokes 30 are disposed in slots or notches 42 that are provided in the upper ends of the straps 34, and pins 43 extending through openings 44 of the straps and into recesses 45 of the yokes maintain the elements in properly adjusted relation. A suitable type of cotter pin 46 can be employed to secure each of the pins 43 against accidental displacement.

Intermediate portions of the yokes 30 are provided with set screws or bolts 50 screw-threaded through the yokes and having their inner ends rounded to engage sockets 52 of pressure plates 53, which in turn engage bead positioning insert elements 54, 55, 56 and 57 (Figure 9) for maintaining the proper shape of the bead portions of the tire during its repair. Plates 60 disposed between the bead positioning elements fill out the contour of the mold and provide a support for the inner periphery of the airbag 10. Preferably the elements 54, 55, 56 and 57 are faced with thin metallic plates 62 and the plates 60 likewise are faced with thin plates 64. In order to facilitate removal of the bead positioning elements they are provided with suitable handles 65.

Figure 8:
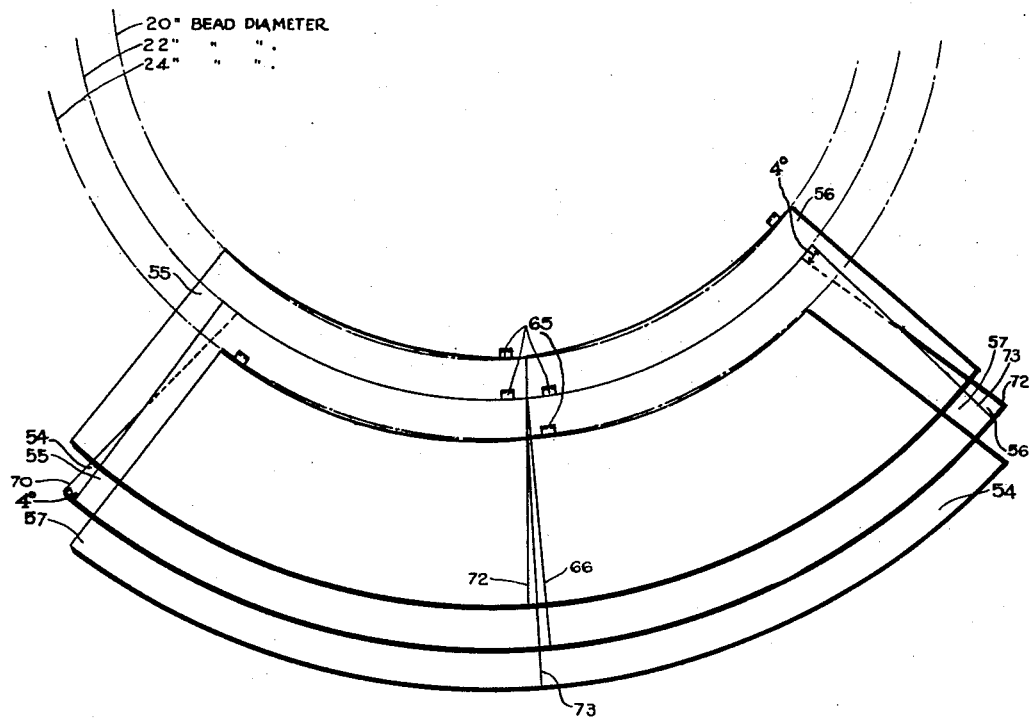
Figure 8 is a diagrammatical view of interchangeable bead-engaging elements as applied to tires of various sizes.
Figure 9:
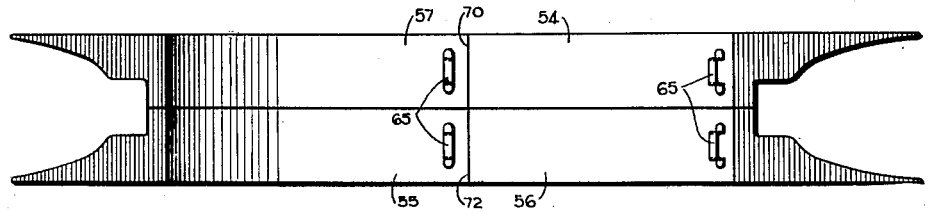
Figure 9 is a diagrammatical plan view of the bead plates arranged to accommodate tire beads of relatively small diameter.

As best shown by Figures 8 to 11, a single set of the four insert elements 54, 55, 56 and 57 are so constructed that they are adapted to be interchangeable in various positions or relations to accommodate the beads of various sizes of tires. For the sake of convenience, three sizes of tires are shown, for example, tires having bead diameters of 20, 22 and 24 inches, as designated in Figure 8. In Figure 9 the plates are shown diagrammatically in the relation required for accommodating tires having beads 20 inches in diameter; in Figure 10 the relation of the elements is such as to accommodate tires having beads 22 inches in diameter; and in Figure 11 the relation is such as to accommodate tires having beads 24 inches in diameter. The mold shown in Figures 3 and 4 is designed for accommodating the intermediate or 22 inch bead diameter.

Figure 10:
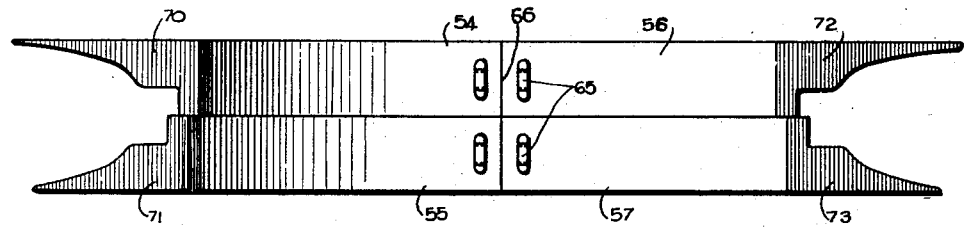
Figure 10 is a diagrammatical view similar to Figure 9 of the bead-engaging elements arranged to accommodate an intermediate size of tire.
Figure 11:
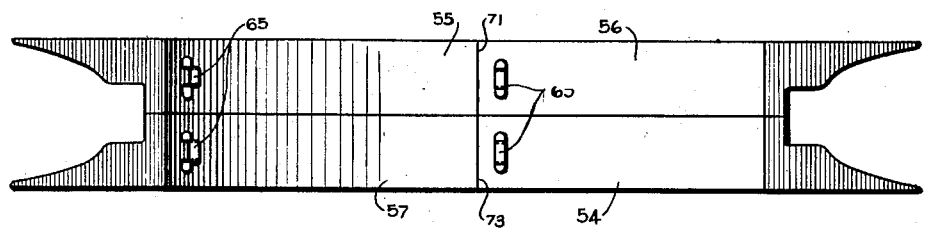
Figure 11 is a diagrammatical view similar to Figure 9 of the bead-engaging elements arranged to accommodate a tire of a larger size.

In the arrangement shown by Figure 10 in which the bead-positioning elements are arranged to accommodate a tire having the intermediate or 22 inch bead diameter, the inner curvature of each of these elements corresponds to the curvature of the 22 inch bead diameter. Referring particularly to Figures 8 and 10, it will be observed that lines 66 define the plane of end abutment between the elements 54 and 56, as well as between the elements 55 and 57, and this line is radial with respect to the inner curvature of the insert elements and of the 22 inch bead diameter. For the sake of convenience the ends of the elements defining this line 66 shall be referred to as the radial ends of the elements. On the other hand the remote ends of the elements 54 and 55 are beveled at angles of approximately 4 degrees to each other, as indicated in Figure 8, and likewise the remote ends of the elements 56 and 57 are beveled at angles of approximately four degrees to each other. Lines 70, 71, 72 and 73 represent the beveled end portions of the elements 54, 55, 56 and 57, respectively, as clearly shown by Figures 8 and 10.

In arranging the elements to accommodate beads of a smaller or 20 inch diameter (Figure 9), the radial end of the element 55 abuts the beveled end 72 of the element 56, and the radial end of the element 57 abuts the beveled end 70 of the element 54. Thus the curve having a radius of such length that the curve through the outer ends of the elements and the inner extremity of the line defining the abutting ends of the elements, corresponds approximately to the curvature of the 20 inch bead, as indicated in the upper broken lines of Figure 9, and the bead positioning elements are thus adapted to fit closely against the tire beads having diameters of 20 inches.

Similarly in arranging the elements to accommodate beads of larger diameter, or 24 inch diameter (Figure 11), the radial end of the element 54 abuts the beveled end 73 of the element 57, and the radial end of the element 56 abuts the beveled end 71 of the element 55. Since the direction of beveling in this instance is opposite that with reference to the arrangement for accommodating the smaller diameter, the inner boundary of the elements corresponds approximately to the curvature of beads having diameters of 24 inches, and the tire beads having such diameters closely fit against the elements during a vulcanizing operation in the mold assembly.

In order to provide further for the proper curing or repairing of various sizes of tires, inserts or shims 75 are disposed between the sections 26 and 27 of the mold, and the bolts 28 serve to center and secure them in their proper positions. The size of the plates 60 may be varied according to the size of the tire which is to be repaired. Moreover in certain instances these plates may be omitted. However, the same plates can be employed for all sizes of tires within a reasonable range.

By inflating the airbag 10 until the proper pressure is exerted upon the tire, and energizing the electric conductors 16 and 24 through electric power lines 76 and 77 connected thereto, as indicated at 78, the tire may be subjected to the requisite vulcanizing heat and pressure and the injured portion cured to the repair material. Conventional electrical devices, such as rheostats, transformers and ammeters, are employed for facilitating and regulating proper application of heat to the pads 12 and 23. Since these devices are well known commercial units, specific description thereof is not believed to be necessary for a proper understanding of this invention.

Conventional casters 80 are provided for supporting and facilitating movement of the mold upon a table or other base.

From the foregoing description it will be apparent that the assembled construction of mold, combined airbag and electric curing pad, and outer pad covering the outer surface of the tire, provides for very efficient localized curing of repair material into an injured tire. Since electricity for heating the device and the air for providing pressure in the airbag are common commodities in nearly all tire repair shops, the convenience of this kind of repair apparatus will be readily appreciated.

Although we have illustrated only the preferred forms which the invention may assume and have described those forms in detail, it will be apparent to those skilled in the art that the invention is not so limited but that various modifications may be made therein without departing from the spirit of the invention or from the scope of the appended claims.

What we claim is:

1. A vulcanizing device comprising an inflatable container and a cover having an electric conductor therein secured to the container.

2. A vulcanizing device comprising an inflatable vulcanizable container having an outer layer of material and an electric conductor constituting a part of the outer layer.

3. A vulcanizing device comprising an inflatable bag, a pad vulcanized to a portion of the surface of the bag, and an electric conductor embedded in the pad.

4. A vulcanizing device comprising an inflatable airbag, a pad including layers of textile and vulcanizable material secured by vulcanization to the outer surface of the airbag walls, and an electric conductor disposed between the layers of the pad and adapted to be heated by electric energy.

5. A vulcanizing device comprising an inflatable airbag and a pad vulcanized about the outer surface of the airbag wall, said pad including a crinkled electric conductor embedded substantially throughout the length and breadth thereof.

6. The combination with a mold for receiving a pneumatic tire therein, of a pad having an electric conductor therein disposed about the inner surface of the mold for engaging the outer surface of the tire, an inflatable airbag having an electric conductor embedded in the walls thereof and adapted to engage the inner surface of the tire, and means for electrically energizing all of the conductors for simultaneously applying vulcanizing heat to the inner and outer surfaces of the tire.

7. A vulcanizing device comprising an expansible container and a cover having a flexible electric conductor therein secured to the container, said conductor being stretchable when the container is expanded.

8. A vulcanizing device comprising an expansible fluid container and a cover vulcanized about the outer surface of the container wall, said cover including a flexible electric conductor embedded substantially throughout the length and breadth thereof.

9. A vulcanizing device comprising an inflatable and expansible fluid container and a pad vulcanized about the outer surface of the container wall, said pad including a flexible crinkled electric conductor embedded therein, said conductor being stretchable when the container is expanded.

KENNETH R. LEWIS.
DELPHIN C. WAUGH.